US007277378B2

(12) United States Patent
Sasaki

(10) Patent No.: US 7,277,378 B2
(45) Date of Patent: Oct. 2, 2007

(54) OFFSET ADJUSTING CIRCUIT FOR OPTICAL DISC AND OFFSET ADJUSTING METHOD

(75) Inventor: Hideaki Sasaki, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 591 days.

(21) Appl. No.: 10/854,360

(22) Filed: May 26, 2004

(65) Prior Publication Data

US 2004/0240372 A1 Dec. 2, 2004

(30) Foreign Application Priority Data

May 26, 2003 (JP) ............................ 2003-147199

(51) Int. Cl.
*G11B 7/00* (2006.01)

(52) U.S. Cl. ............................ 369/124.12; 369/44.29; 369/44.36

(58) Field of Classification Search ..................... None
See application file for complete search history.

(56) References Cited

U.S. PATENT DOCUMENTS 5,189,654 A * 2/1993 Minakuchi ............... 369/44.36
5,574,714 A * 11/1996 Masashi et al. .......... 369/124.1
6,104,682 A * 8/2000 Konishi ................... 369/44.34
6,181,667 B1 * 1/2001 Mori et al. ............ 369/112.03

FOREIGN PATENT DOCUMENTS

JP 10-105997 4/1998

* cited by examiner

*Primary Examiner*—William Korzuch
*Assistant Examiner*—Peter Vincent Agustin
(74) *Attorney, Agent, or Firm*—SoCal IP Law Group LLP; Steven C. Sereboff; John E. Gunther

(57) ABSTRACT

An offset adjusting circuit for an optical disc comprises a plurality of offset-adjustment differential operational amplifiers, each of the amplifiers having an input terminal to which an output signal of an optical pickup is input and another input terminal to which a control voltage is applied, an adding circuit that adds output signals of the offset-adjustment differential operational amplifiers, an A/D converter that outputs a digital signal based on an output signal of the adding circuit, and a control voltage adjuster that varies the control voltage applied to the offset-adjustment differential operational amplifiers based on the digital signal so as to remove an offset.

5 Claims, 7 Drawing Sheets

※ WITH OFFSET ADJUSTED
→IN NORMAL PERIOD RFDC = Vref1
→IN SCRATCH PERIOD RF SIGNAL < Vref1

OFFSET ADJUSTING CIRCUIT FOR OPTICAL DISC AND OFFSET ADJUSTING METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

RELATED APPLICATION INFORMATION

The present application claims priority upon Japanese Patent Application No. 2003-147199 filed on May 26, 2003, which is herein incorporated by reference.

BACKGROUND OF THE INVENTION

1. Field of the Invention

The present invention relates to an offset adjusting circuit for an optical disc and an offset adjusting method.

2. Description of the Related Art

Generally, in an optical disc playback (and recording) apparatus (hereinafter referred to as an "optical disc apparatus"), after amplifying, for example, four output signals from an optical pickup, a combined RF signal is obtained by adding those signals in an adder (See, for example, Japanese Patent Application Laid-open Publication No. 10 105997 (FIG. 1)).

Specifically, as shown in FIG. 6, the optical disc apparatus irradiates an optical disc 105 with one spot of a light beam. A photo-detector group of an optical pickup 200 receives reflected light from this optical disc 105. Based on the reflected light, the optical pickup 200 supplies various output signals to an RF signal processing circuit 110. Based on these output signals, the RF signal processing circuit 110 generates an RF signal and various error signals. Based on these error signals, a servo signal processing circuit 140 carries out servo control to prevent the degradation of accuracy in focusing servo and tracking servo of an objective lens of the optical pickup 200. Note that a recording system REC, as known well, is realized by constituents indicated by reference numerals 112 through 118 of FIG. 6.

A playback system PB of this optical disc apparatus will be described. The RF signal processing circuit 110 supplies the RF signal, a combined signal, to a decoder 120. The decoder 120 performs processing such as de-interleave processing, decoding for error correction, EFM demodulation, and the like on the RF signal and supplies reproduced data to a memory 121.

The memory 121 is controlled in terms of write-in and read-out of data by a system controller (microcomputer) 150, and the reproduced data is written therein from the decoder 120. Also, the reproduced data is consecutively read out from the memory 121 at a constant bit rate. The reproduced data consecutively read out from the memory 121 is supplied to a decoder 122. When the reproduced data is compressed data, this decoder 122 decompresses the data to, for example, four times its size. Digital data from the decoder 122 is supplied to a D/A converter 123 to be converted into an analog signal, which is drawn to the outside through an output terminal 124.

Here, the RF signal processing circuit 110 outputting the RF signal will be described. As shown in FIG. 7, an output signal A obtained from the optical pickup 200 is input to a resistor R10*a* and an output signal B obtained from the optical pickup 200 is input to a resistor R10*b*. Also, an output signal C obtained from the optical pickup 200 is input to a resistor R10*c* and an output signal D obtained from the optical pickup is input to a resistor R10*d*. Note that these output signals A to D are, as known well, among the output signals obtained from the detector of the optical pickup 200 and described, for example, on page 218 of a literature "Illustrated Compact Disc Reader", Ohmsha, Ltd., Japan, Jun. 20, 2002, the First Impression of the Third Edition.

With regard to an offset-adjustment differential operational amplifier OP1, a combined signal AB of the output signals A and B is input to the inverting input terminal thereof through the resistors R10*a* and R10*b*, and a fixed reference voltage Vref0 is applied to the non-inverting input terminal of the amplifier OP1. This offset-adjustment differential operational amplifier OP1 outputs an amplified signal A'B' to an adding circuit SUM, which signal is expressed by an operational expression:

R20ab×(1/R10a+1/R10b+1/R20ab)×{Vref−(voltage value of output signal A/R10a+voltage value of output signal B/R10b)/(1/R10a+1/R10b+1/R20ab)}.

In contrast, with regard to an offset-adjustment differential operational amplifier OP2, a combined signal CD of the output signals C and D is input to the inverting input terminal thereof through the resistors R10*c* and R10*d*, and the fixed reference voltage Vref0 is applied to the non-inverting input terminal of the amplifier OP2. This offset-adjustment differential operational amplifier OP2 outputs an amplified signal C'D' to the adding circuit SUM, which signal is expressed by the operational expression:

R20cd×(1/R10c+1/R10d+1/R20cd)×{Vref−(voltage value of output signal C/R10c+voltage value of output signal D/R10d)/(1/R10c+1/R10d+1/R20cd)}.

The adding circuit SUM adds the input amplified signals A'B' and C'D' to output a combined signal ABCD. This output combined signal ABCD is input to an external capacitor C0 through a first terminal T1, so that with the direct current component removed, only the alternating current component returns to the inside of the RF signal processing circuit 110 through a second terminal T2. The returned alternating current component is superimposed on the fixed reference voltage Vref0 through a resistor R40 to be input to a buffer amplifier BA0. This buffer amplifier BA0 outputs an RF signal. This RF signal is supplied via another buffer amplifier BA1 to the decoder 120 of FIG. 6, which performs playback processing thereon, and also supplied to a flaw detection circuit DET.

This flaw detection circuit DET detects a flaw on an optical disc from which signals are read out by the optical pickup 200 based on the RF signal output from the adding circuit SUM. That is, the flaw detection circuit DET has a comparator having a reference voltage Vref1 input to the non-inverting input terminal thereof, and the RF signal from the buffer amplifier BA0 is input to the inverting input terminal of this comparator. When the intensity (voltage level) of this RF signal is less than the reference voltage Vref1, it is determined that the portion that the optical pickup 200 is irradiating with laser light is a portion with a flaw, and a signal of a "H" level is output as a flaw detection signal to the servo signal processing circuit 140. The servo signal processing circuit 140 having received this flaw detection signal performs, for example, processing for preventing malfunction caused by the effect of the flaw.

In the above related art shown in FIG. 7, for the combined signal ABCD obtained from the adding circuit SUM, the direct current component thereof is removed by the external capacitor C0. Then, the signal is forcibly superimposed on the fixed DC voltage Vref0 via the resistor R40. By this means, an attempt to remove the DC offset of the combined signal of the adding circuit SUM as much as possible is made.

However, the DC offset cannot be adjusted flexibly only by superimposing the signal on the fixed DC voltage Vref0. Specifically, because there is no flexibility in DC offset adjusting function, various problems occur. That is, if variations occur in the intensity of the reflected light because of difference in the specifications or the like of the optical pickup or the type of optical disc, the output signals from the optical pickup themselves cannot be accurately adjusted in terms of their offsets. As a result, the RF signal is generated based on the output signals whose offsets have not been accurately adjusted.

Therefore, at the stage where the differential operational amplifiers generate the combined signal of the output signals A to D of the optical pickup for generating the RF signal, each of the output signals A to D deviates from the dynamic range of the processing system including the differential operational amplifiers due to the insufficient adjustment of the offsets, so that the waveform thereof may be distorted. In particular, because a dynamic range of a circuit system operating at a low power supply voltage is relatively narrow with a small margin, the possibility of the waveform distortion becomes high.

As described above, as a result of not being able to generate a precise RF signal, the degradation of accuracy in processing in the playback processing system and the flaw detection circuit is caused. In particular, in the flaw detection circuit DET, accuracy in level-setting for flaw detection cannot be improved, thus causing the degradation of accuracy in flaw detection.

SUMMARY OF THE INVENTION

According to one aspect of the present invention, there is provided an offset adjusting circuit for an optical disc comprising a plurality of offset-adjustment differential operational amplifiers, each of the amplifiers having an input terminal to which an output signal of an optical pickup is input and another input terminal to which a control voltage is applied, an adding circuit that adds output signals of the offset-adjustment differential operational amplifiers, an A/D converter that outputs a digital signal based on an output signal of the adding circuit, and a control voltage adjuster that varies the control voltage applied to the offset-adjustment differential operational amplifiers based on the digital signal so as to remove an offset.

That is, by varying the control voltage for the offset-adjustment differential operational amplifiers to which an output signal of the optical pickup is input, the offset of the output signal of the adding circuit is adjusted. Therefore, first, the offset that originates from the optical pickup can be adjusted. In addition, the offset that originates from a processing system including the offset-adjustment differential operational amplifiers and the adding circuit can be adjusted together therewith. Therefore, the output signal of the adding circuit is a signal in which the offset that originates from the upstream processing system including the optical pickup has been adjusted. As a result, also in the downstream processing system that performs signal processing based on the output signal having the offset adjusted such as the flaw detection circuit for detecting flaws on an optical disc and the system of playback processing based on the RF signal, i.e. the output signal of the adding circuit, the RF signal can be made to fall within the dynamic range thereof.

Therefore, the dynamic range of each circuit that processes the RF signal having the offset adjusted can be effectively utilized. In particular, circuitry specified to operate at a low power supply voltage has a narrow dynamic range, but the offset adjustment according to the present invention can make the RF signal fall within that range. Thus, accuracy degradation such as waveform distortion can be prevented in signal processing in, for example, the flaw detection circuit and the playback processing system, and thereby highly flaw detection and playback processing become possible.

Furthermore, because the offset of the output signal that originates from the optical pickup can be adjusted, offset adjustment can be appropriately performed even when optical pickups of various specifications in terms of output signal intensity and the like are connected to the offset adjusting circuit for optical discs. Moreover, for various types of optical discs different in the intensity of reflected light, offset adjustment can be appropriately performed because the offset that originates from the optical pickup can be adjusted.

Yet further, in implementing the offset adjusting circuit, the downstream processing system that performs signal processing based on the RF signal having the offset adjusted such as the flaw detection circuit and the playback processing system does not need to be changed in design but is used as it is.

Still further, the offset adjusting circuit for an optical disc may further comprise a flaw detection circuit that detects a flaw on an optical disc from which the optical pickup reads out a signal, based on the output signal of the adding circuit.

That is, the offset that originates from the upstream processing system including the optical pickup can be adjusted. As a result, accuracy degradation such as waveform distortion can be prevented in signal processing in the flaw detection circuit, and thereby highly accurate flaw detection process becomes possible. Also, level setting for flaw detection in the flaw detection circuit becomes easy.

Moreover, the control voltage adjuster may change the control voltage such that a level of the output signal of the adding circuit equals to a target voltage.

Also, the target voltage can be set at such a value as to enable the output signal of the adding circuit to fall within a dynamic range of a circuit performing signal processing based on the output signal.

That is, the output signal of the adding circuit can be made to fall within the dynamic range thereof also in the circuits that perform signal processing based on the output signal such as the flaw detection circuit for detecting a flaw on an optical disc and the playback processing system. Hence, highly accurate offset adjustment becomes possible, and thus, accuracy degradation such as waveform distortion can be prevented in signal processing in the flaw detection circuit and the playback processing system, and highly accurate flaw detection and playback processing become possible.

In addition, the output signal of the adding circuit can be made to fall within the dynamic range of the A/D converter and the like. Thus, a high resolution A/D converter is not required and thereby cost and power consumption can be reduced.

The offset adjusting circuit for an optical disc may further comprise a direct current component output circuit and that the direct current component output circuit outputs the direct current component of the output signal of the adding circuit to the A/D converter.

That is, in order to eliminate the offset, the control voltage applied to the offset-adjustment differential operational amplifiers can be varied based on the digital signal corresponding to the DC component of the output signal of the adding circuit. That is, by adjusting the offset based on the DC component of the output signal, the RF signal can be made to certainly fall within the dynamic range thereof also in the circuits that perform signal processing based on the output signal having its offset adjusted such as the flaw detection circuit for detecting flaws on an optical disc and the system of playback processing based on the RF signal, the output signal of the adding circuit. Hence, highly accurate offset adjustment becomes possible, and thus, a highly accurate RF signal can be obtained, so that highly accurate flaw detection and playback processing become possible.

According to another aspect of the present invention, there is provided an offset adjusting method for an optical disc apparatus comprising the steps of adding output signals of a plurality of offset-adjustment differential operational amplifiers, each of the amplifiers having an input terminal to which an output signal of an optical pickup of the optical disc apparatus is input and another input terminal to which a control voltage is applied; converting the added signal into a digital signal; and varying the control voltage applied to the offset-adjustment differential operational amplifiers based on the digital signal so as to remove an offset.

Features and objects of the present invention other than the above will become clear by reading the description of the present specification with reference to the accompanying drawings.

DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

=Entire Outline=

Figure 1:
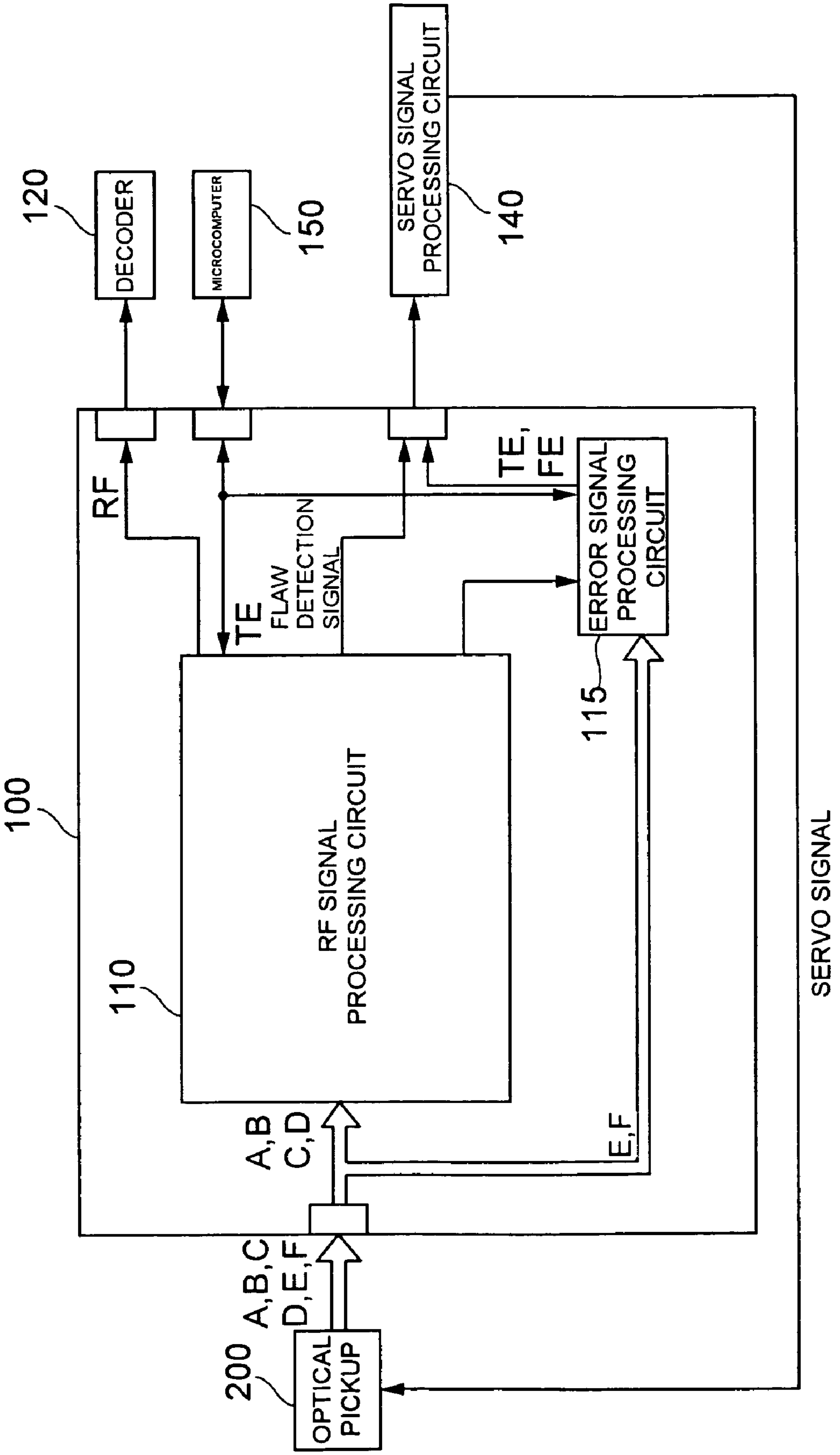
FIG. 1 is a block diagram showing the main part of an optical disc playback apparatus including an offset adjusting circuit for an optical disc according to the present invention.
Figure 6:
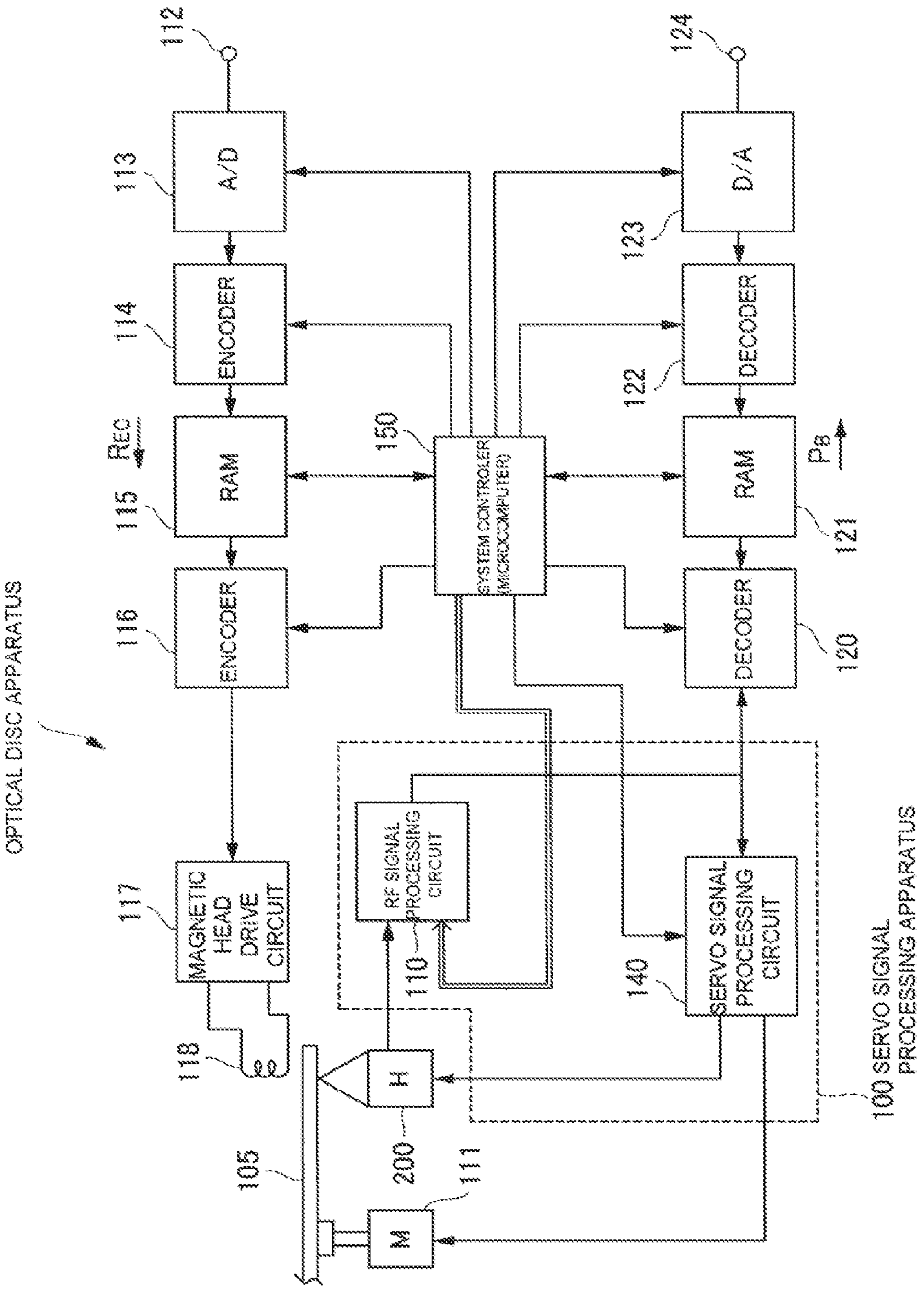
FIG. 6 is a block diagram of a conventional optical disc playback apparatus.

An optical disc analog signal generating circuit applicable to, for example, the above-described optical disc apparatus as shown in FIG. 6 will be explained. As shown in FIG. 1, an optical disc analog signal generating circuit 100 generates an RF signal adjusted to remove or reduce the DC offset (offset of the direct current component of the signal) based on the output signals A to D from the optical pickup 200. This optical disc analog signal generating circuit 100 is constituted by a one-chip-type integrated circuit. Alternatively, this integrated circuit can be produced with a CMOS process as a part of an optical disc playback signal processing LSI. The optical disc analog signal generating circuit 100 comprises an error signal generating circuit 115 that generates error signals such as a tracking error signal TE and a focus error signal FE, and the RF signal processing circuit (offset adjusting circuit for an optical disc) 110 that generates an RF signal as described in the description of the related art. The error signal generating circuit 115 outputs the tracking error signal TE and the focus error signal FE to the servo signal processing circuit 140.

The RF signal processing circuit 110, when generating an RF signal, operates to remove the DC offset thereof. This RF signal having the DC offset adjusted is supplied to the flaw detection circuit and the playback processing system described in the description of the related art.

=Embodiment=

Figure 7:
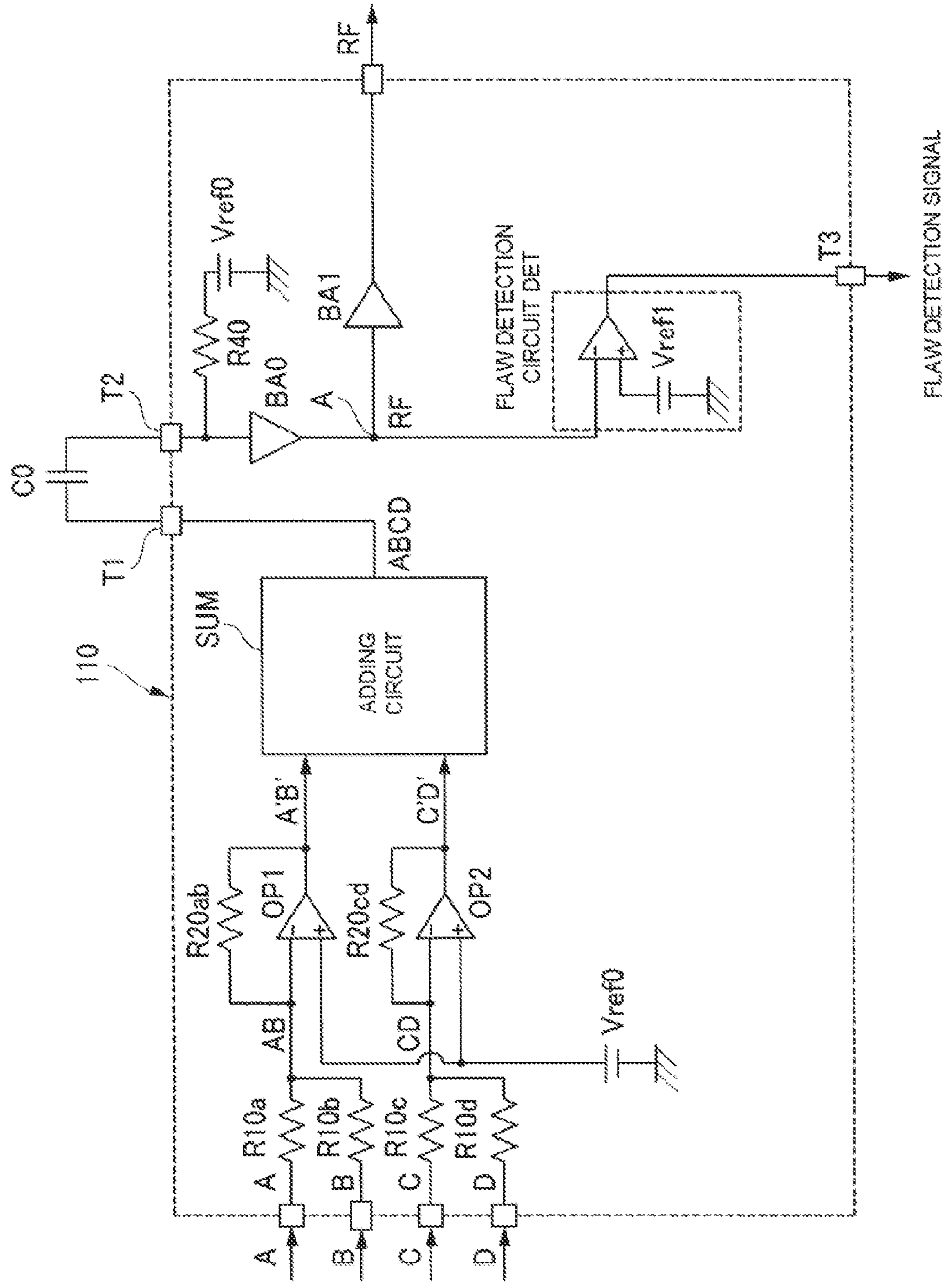
FIG. 7 is a block diagram of a conventional RF signal processing circuit.

With regard to the circuit system generating the RF signal of the RF signal processing circuit 110, a scheme for removing or reducing the DC offset will be described with reference to FIGS. 1 to 5. A description of the same parts as described regarding the related art with reference to FIG. 7 is omitted to avoid duplication, and a description will be made focused on the different parts.

<Configuration>

Figure 2:
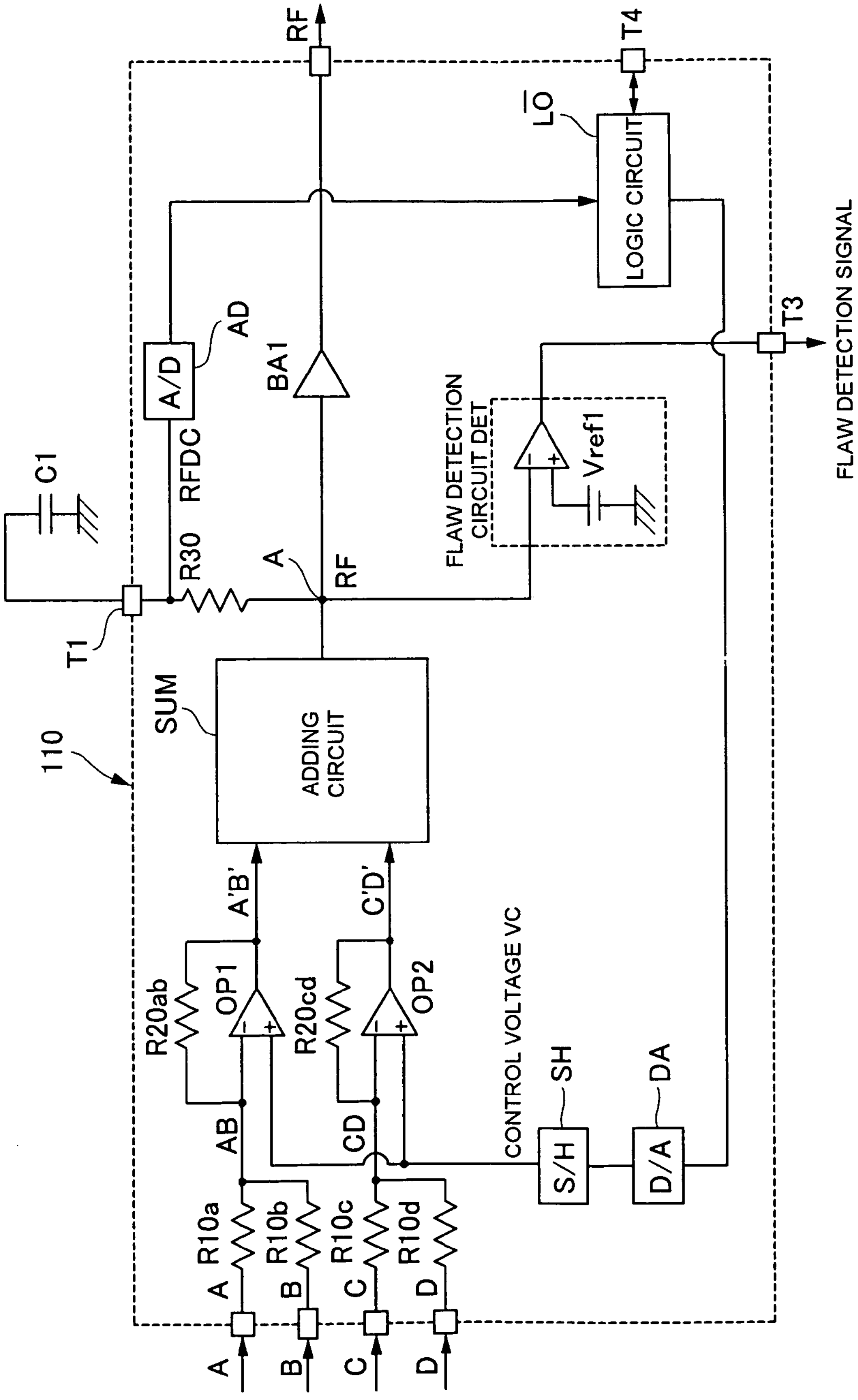
FIG. 2 is a block diagram showing the offset adjusting circuit for an optical disc according to the present invention.

As shown in FIG. 2, the RF signal processing circuit 110 comprises resistors R10*a*, R10*b*, R10*c*, and R10*d*; a plurality of offset-adjustment differential operational amplifiers OP1, OP2; return resistors R20*ab*, R20*cd*; an adding circuit SUM; a buffer amplifier BA1; a resistor (a part of a DC component output circuit) R30; an A/D converter AD; a logic circuit (control voltage adjuster) LO constituted by a microcomputer or the like; a D/A converter DA; and a sample-and-hold circuit SH. Furthermore, an external capacitor C1 (a part of the DC component output circuit) is connected to the RF signal processing circuit 110.

One ends of resistors R10*a*, R10*b* are connected respectively to external input terminals A, B of the RF signal processing circuit 110, and the output signals A, B obtained from the optical pickup are input thereto. The other ends of the resistors R10*a*, R10*b* are connected to each other and to the inverting input terminal of the offset-adjustment differential operational amplifier OP1. One end of the return resistor R20*ab* is connected to the output terminal of this offset-adjustment differential operational amplifier OP1. The other end of the return resistor R20*ab* is connected to the inverting input terminal of the offset-adjustment differential operational amplifier OP1. The output terminal of the sample-and-hold circuit SH is connected to the non-inverting input terminal of the offset-adjustment differential operational amplifier OP1. Furthermore, the output terminal of the offset-adjustment differential operational amplifier OP1 is connected to the well-known adding circuit SUM.

In contrast, one ends of resistors R10*c*, R10*d* are connected respectively to external input terminals C, D of the RF signal processing circuit 110, and the output signals C, D obtained from the optical pickup are input thereto. The other ends of the resistors R10*c*, R10*d* are connected to each other and to the inverting input terminal of the offset-adjustment differential operational amplifier OP2. One end of the return resistor R20*cd* is connected to the output terminal of this offset-adjustment differential operational amplifier OP2. The other end of the return resistor R20*cd* is connected to the inverting input terminal of the offset-adjustment differential operational amplifier OP2. The output terminal of the sample-and-hold circuit SH is connected to the non-inverting input terminal of the offset-adjustment differential operational amplifier OP2. Furthermore, the output terminal of the offset-adjustment differential operational amplifier OP2 is connected to the adding circuit SUM.

The output terminal of the adding circuit SUM is connected to one end of the resistor R30, the input terminal of the buffer amplifier BA1, and the inverting input terminal of the comparator of the flaw detection circuit DET. The other end of the resistor R30 is connected to an external connection terminal T1 and the input terminal of the A/D converter AD. This external connection terminal T1 is connected to one end of the external capacitor C1. The other end of the external capacitor C1 is connected to a ground. In this circuit configuration, a smoothing circuit (DC component output circuit) is constituted by a series circuit of the resistor R30 and the capacitor C1. The output terminal of the A/D converter AD is connected to the input terminal of the logic circuit LO. One output terminal of the logic circuit LO is connected to the input terminal of the D/A converter DA. The output terminal of the D/A converter DA is connected to the input terminal of the sample-and-hold circuit SH. The output terminal of the sample-and-hold circuit SH is connected to the non-inverting input terminal of each of the offset-adjustment differential operational amplifiers OP1, OP2. Note that the other output terminal of the logic circuit LO is connected to an external connection terminal T4, which is connected to the microcomputer 150 of FIG. 1.

Moreover, a reference voltage Vref1 for setting a level for detecting flaws on an optical disc is connected to the non-inverting input terminal of the comparator of the flaw detection circuit DET. The output terminal of the comparator is connected to an external connection terminal T3. Note that various well-known configurations such as one described in, for example, Japanese Patent Application Laid-open Publication No. 8 96361 can be used as the flaw detection circuit DET.

Note that while in the case of a conventional circuit shown in FIG. 7, the connection of the external capacitor C0 needs two external connection terminals (T1, T2), in the case of the circuit shown in FIG. 2 according to the present embodiment, the connection of the external capacitor C1 needs only one external connection terminal (T1).

<Offset Adjusting Operation>

Figure 3:
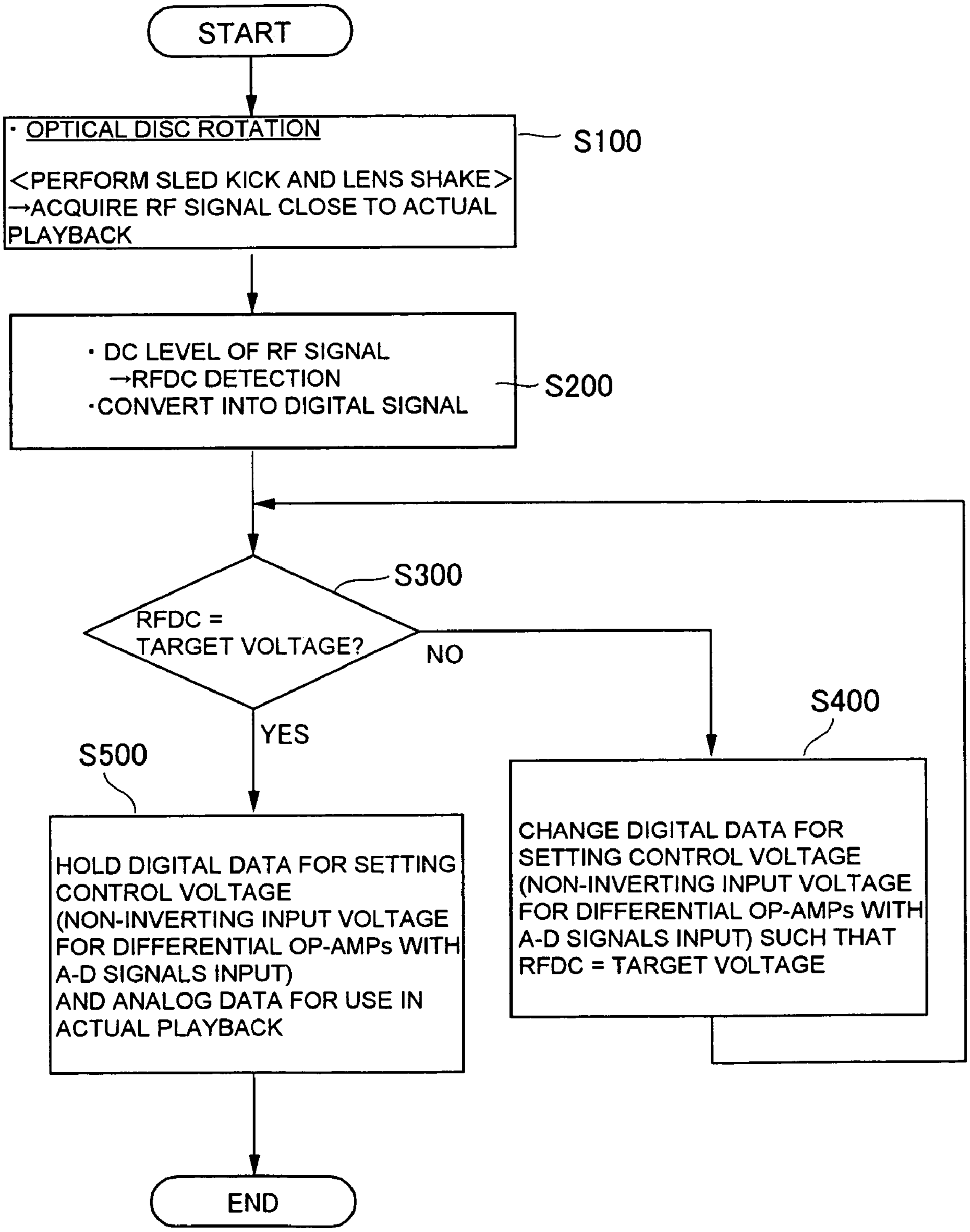
FIG. 3 is a flow chart showing an offset adjusting method according to the present invention.

As shown in FIG. 3, according to instructions from the microcomputer 150, the servo signal processing circuit 140 rotates the optical disc (S100). At this time, operations such as so-called sled kick and lens shake, which make the optical pickup 200 move across in the radial direction of the optical disc, are performed. By this means, the output signals A to D that are close to those of the actual playback processing can be obtained.

That is, according to instructions from the microcomputer 150, a control program for DC offset adjustment running on the logic circuit LO executes DC offset adjustment. First, when the offset adjustment operation process has started, the RF signal, the combined signal of the output signals A to D from the optical pickup, is output from the adding circuit SUM as described in the description of the related art. The DC component of the RF signal is obtained via the resistor R30 and input into the A/D converter AD.

Next, the logic circuit LO obtains a digital signal of the DC component RFDC of the RF signal (at a point A in the Figure) from the A/D converter AD (S200). Then, based on this digital signal, the logic circuit LO changes a control voltage VC applied to the offset-adjustment differential operational amplifiers OP1, OP2 in order to remove the DC offset. That is, the logic circuit LO, based on the digital signal from the A/D converter AD, determines whether a level of the DC component RFDC of the RF signal equals to a target voltage (S300). If not equal (S300: NO), digital data for setting the control voltage VC is changed such that the level of the DC component RFDC becomes equal to the target voltage (S400). This digital data for setting the control voltage VC is converted by the D/A converter DA into an analog signal, which is held by the sample-and-hold circuit SH and supplied as the control voltage VC to the offset-adjustment differential operational amplifiers OP1, OP2.

Such control logic is represented, for example, as a control table created beforehand, and stored in the memory of the logic circuit LO such that they can be referred to. Also, a level of the target voltage is about half (preferably, exactly half) a power supply voltage Vdd, which is supplied to circuits performing signal processing based on the RF signal at the point A in FIG. 2, and is stored beforehand in the memory of the logic circuit LO such that it can be referred to. That is, a level of the DC component RFDC of the RF signal is adjusted to be about half the power supply voltage Vdd supplied to the circuits performing signal processing based on the RF signal. As a result, a level of the RF signal can be made to fall within the dynamic range of the circuits performing signal processing based on the RF signal having the offset adjusted such as the flaw detection circuit DET, the playback processing system, the A/D converter AD, the logic circuit LO and the like.

Figure 4A:
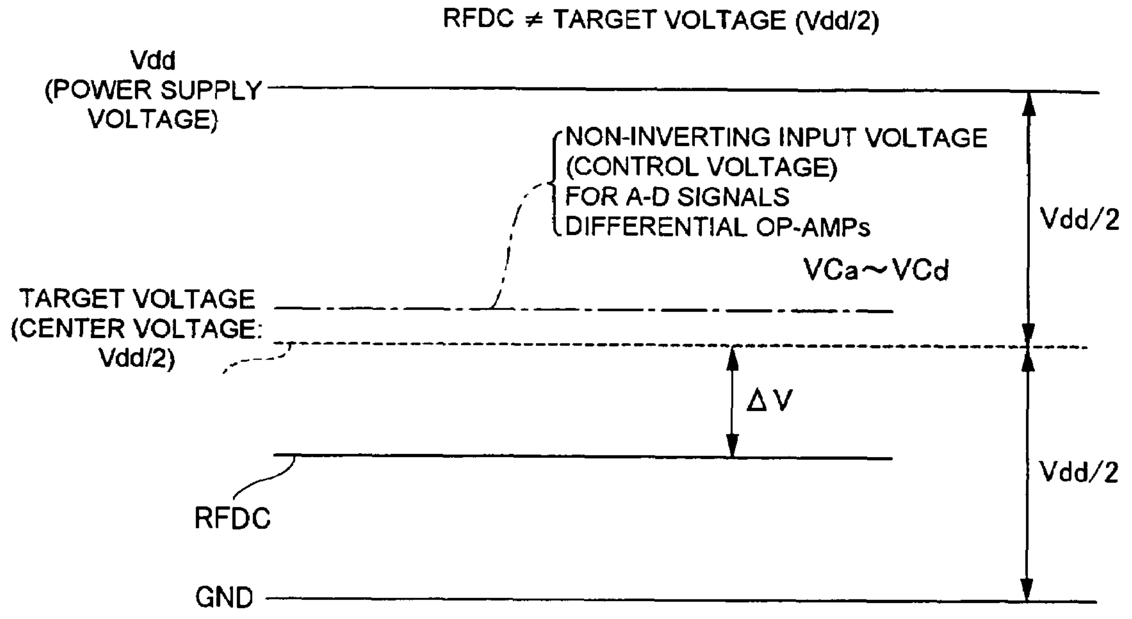
FIG. 4 is graphs representing how to control according to the offset adjusting method of the present invention, (a) shows a case where the DC component RFDC of an RF signal does not coincide with a target voltage, and (b) shows a case where the DC component RFDC of the RF signal coincides with the target voltage.

When the level of the DC component RFDC of the RF signal does not equal to the target voltage, the DC component RFDC (shown with a solid line) has a voltage difference of $+\Delta V$ relative to the target voltage (shown with a broken line) as shown in the graph of FIG. 4A, or a voltage difference of $-\Delta V$, the opposite in polarity. In this case, the RF signal having the DC component RFDC as its center, an analog waveform signal, is processed in each part of the circuitry, and thus the analog waveform does not fall within the range of from the power supply voltage (Vdd) to the ground voltage (the dynamic range), so that the analog waveform is distorted with the upper or lower end cut away.

Figure 4B:
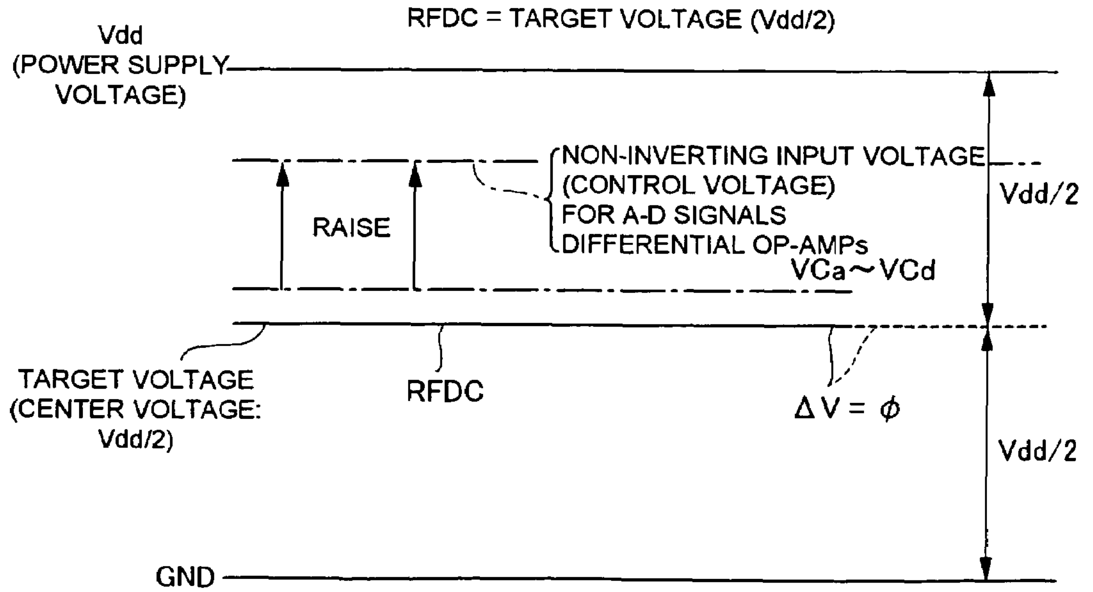

However, when the above-mentioned offset adjustment is completed, a level of the control voltage VC is raised as shown in the graph of FIG. 4B (or lowers in the case of the opposite in polarity $-\Delta V$), so that the level of the DC component RFDC of the RF signal equals to the target voltage ($\Delta V$=zero). Thus, the analog waveform falls within the range of from the power supply voltage (Vdd) to the ground voltage (the dynamic range), so that the dynamic range is used effectively and thereby the waveform is prevented from being distorted.

Note that the value of the target voltage is not limited to about half the power supply voltage Vdd, but need only be set at such a value as enables the RF signal, the output signal of the adding circuit SUM, to fall within the dynamic range of the circuits performing signal processing based on this RF signal.

After the above process of S400, the process returns to the above-mentioned process of S300, and when the digital value RFDC equals to that of the target voltage (or digital data equivalent thereto) (S300: YES), considering that the DC offset adjustment is complete, the control voltage VC when they are equal is held by the sample-and-hold circuit SH (S500) and used as a setting value for actual optical disc playback processing.

<Scratch Detection Operation in Actual Playback>

Figure 5:
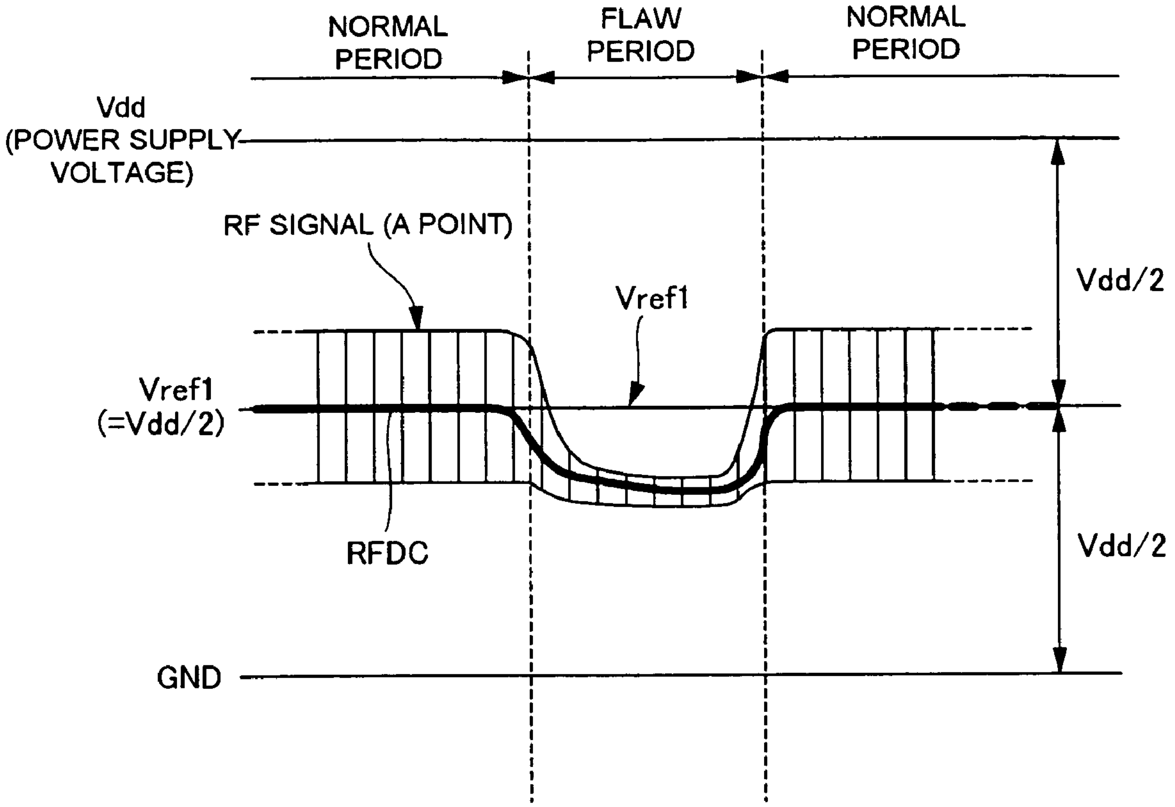
FIG. 5 is a graph representing how to control according to the offset adjusting method of the present invention and contrasting a period where a flaw on the optical disc exists and a period where no flaw exists.

After the above DC offset adjustment is complete, immediately, the actual playback operation of the optical disc starts. Used as the value of the control voltage VC for this playback is the setting value that is sampled and held by the sample-and-hold circuit SH when the DC offset adjustment finishes as mentioned above. That is, since the DC offset of the RF signal at the point A of FIG. 2 is controlled as mentioned above, the precise RF signal having its DC offset adjusted is input to the comparator of the flaw detection circuit DET. As a result, accuracy in detecting flaws on the optical disc can be improved. That is, as shown in, for example, the graph of FIG. 5 illustrating a period where a flaw on the optical disc exists and a period where no flaw exists, the reference voltage Vref input into the comparator of the flaw detection circuit DET is set at the target voltage Vdd/2 (or slightly lower than the target voltage). By this means, the RF signal can be made to fall within the dynamic range of the comparator of the flaw detection circuit DET. In this case, in normal periods on the left and the right in the graph, a level of the DC component RFDC of the RF signal equals to the reference voltage Vref1, and hence the reference voltage Vref1 falls within the voltage swing of the RF signal, so that the output of the comparator is not constantly at "H" (alternates between "H" and "L"). On the other hand, in the center area, the flaw period, of the graph, the entire voltage swing of the RF signal is lower than Vref1, and hence the output of the comparator is constantly at "H". The servo signal processing circuit 140 determines that a flaw exists, according to this constant "H" output. As described above, the DC offset of the RF signal input into the flaw detection circuit DET can be controlled, and thus it becomes easy to set the level for flaw detection.

Although the present invention has been specifically described based on an embodiment thereof, not being limited to this, various changes can be made thereto without departing from the scope thereof.

For example, the signal input to the non-inverting input terminal of the comparator of the flaw detection circuit DET may be the DC component RFDC thereof instead of the analog waveform RF signal from the adding circuit SUM. By comparing the DC component RFDC with the reference voltage Vref1, a definite comparing result can be output.

Moreover, while the flaw detection is being performed during the actual playback operation, the above offset adjustment may be performed in parallel.

According to the present embodiment, the following operations and effects are achieved.

By varying the control voltage of the offset-adjustment differential operational amplifiers to which the output signals of the optical pickup are input, the offset of the output signal of the adding circuit is adjusted. Thus, first, the offset that originates from the optical pickup can be adjusted. In addition, the offset that originates from the processing system including the offset-adjustment differential operational amplifiers and the adding circuit can be adjusted together therewith. Therefore, the output signal of the adding circuit is an adjusted signal having the offset that originates from the upstream processing system including the optical pickup. As a result, in the downstream processing system, which performs signal processing based on the output signal having the offset adjusted, such as the flaw detection circuit for detecting flaws on an optical disc and the system of playback processing based on the RF signal, i.e. the output signal of the adding circuit, the RF signal can be made to fall within the dynamic range thereof.

Therefore, the dynamic range of each circuit that processes the RF signal having the offset adjusted can be effectively utilized. In particular, in circuitry specified to operate at a low power supply voltage accompanying a narrow dynamic range, the offset adjustment according to the present embodiment can make the RF signal fall within that range. Thus, accuracy degradation such as waveform distortion can be prevented in signal processing in, for example, the flaw detection circuit and the playback processing system, and thereby highly accurate flaw detection and playback processing become possible.

Furthermore, because the offset of the output signal that originates from the optical pickup can be adjusted, offset adjustment can be appropriately performed even when optical pickups of various specifications in terms of output signal intensity and the like are connected to the offset adjusting circuit for optical discs. Moreover, for various types of optical discs different in the intensity of reflected light, offset adjustment can be appropriately performed because the offset that originates from the optical pickup can be adjusted.

Yet further, in implementing the offset adjusting circuit, the downstream processing system for signal processing based on the RF signal having the offset adjusted such as the flaw detection circuit and the playback processing system does not need to be changed in design but is used as it is.

The offset that originates from the upstream processing system including the optical pickup can be adjusted. As a result, accuracy degradation such as waveform distortion can be prevented in signal processing in the flaw detection circuit, and thereby highly accurate flaw detection becomes possible. Also, level setting for flaw detection in the flaw detection circuit becomes easy.

The output signal of the adding circuit can be made to fall within the dynamic range thereof also in the circuits that perform signal processing based on this output signal such as the flaw detection circuit for detecting flaws on an optical disc and the playback processing system. Hence, highly accurate offset adjustment becomes possible, and thus, accuracy degradation such as waveform distortion can be prevented in signal processing in the flaw detection circuit and the playback processing system, and highly accurate flaw detection and playback processing become possible.

In addition, the output signal of the adding circuit can be made to fall within the dynamic range of the A/D converter and the like. Thus, a high resolution A/D converter is not necessary and thereby cost and power consumption can be reduced.

In order to eliminate the offset, the control voltage applied to the offset-adjustment differential operational amplifiers can be varied based on the digital signal corresponding to the DC component of the output signal of the adding circuit. That is, by adjusting the offset based on the DC component of the output signal, the RF signal can be made to certainly fall within the dynamic range thereof also in the circuits that perform playback processing based on the output signal having its offset adjusted such as the flaw detection circuit for detecting flaws on an optical disc and the system of playback processing based on the RF signal, the output signal of the adding circuit. Hence, highly accurate offset adjustment becomes possible, and thus, a highly accurate RF signal can be obtained, so that highly accurate flaw detection and playback processing become possible.

Because of having the offset adjustment function, the dynamic range of each circuit that processes the RF signal having the offset adjusted can be effectively utilized. In particular, when the flaw detection circuit uses the RF signal having the offset adjusted, accuracy degradation such as waveform distortion can be prevented in signal processing in the flaw detection circuit, and thereby highly accurate flaw detection becomes possible. Also, level setting for flaw detection in the flaw detection circuit becomes easy.

Although the preferred embodiment of the present invention has been described in detail, it should be understood that various changes, substitutions and alterations can be made therein without departing from the spirit and scope of the invention as defined by the appended claims.

It is claimed:

1. An offset adjusting circuit for an optical disc comprising:

- a plurality of offset-adjustment differential operational amplifiers, each of the amplifiers having an input terminal to which an output signal of an optical pickup is input and another input terminal to which a control voltage is applied;
- an adding circuit that adds output signals of the offset-adjustment differential operational amplifiers to output an RF signal;
- a direct current component output circuit that outputs a direct current component of the RF signal;
- an A/D converter that outputs a digital signal of the direct current component;
- a logic circuit that outputs a digital signal for setting the control voltage, such that a level of the direct current component becomes equal to a target voltage, based on the digital signal of the direct current component; and
- a D/A converter that outputs the control voltage from the digital signal for setting the control voltage.

2. The offset adjusting circuit for an optical disc according to claim 1, further comprising:

- a flaw detection circuit that detects a flaw on an optical disc from which the optical pickup reads out a signal, based on the RF signal.

3. The offset adjusting circuit for an optical disc according to claim 1, wherein

- the logic circuit
  - determines whether the level of the direct current component equals to the target voltage, based on the digital signal of the direct current component, and
  - changes the digital signal for setting the control voltage, such that the level of the direct current component becomes equal to the target voltage, when determining that the level of the direct current component does not equal to the target voltage.

4. The offset adjusting circuit for an optical disc according to claim 1, further comprising:

- a sample-and-hold circuit that samples and holds the control voltage output from the D/A converter.

5. An offset adjusting method for an optical disc apparatus comprising the steps of:

- adding output signals of a plurality of offset-adjustment differential operational amplifiers to output an RF signal, each of the amplifiers having an input terminal to which an output signal of an optical pickup of the optical disc apparatus is input and another input terminal to which a control voltage is applied;
- outputting a direct current component of the RF signal;
- outputting a digital signal of the direct current component;
- outputting a digital signal for setting the control voltage, such that a level of the direct current component becomes equal to a target voltage, based on the digital signal of the direct current component; and
- obtaining the control voltage from the digital signal for setting the control voltage.

* * * * *